United States Patent [19]
Blair

[11] 3,808,877
[45] May 7, 1974

[54] CAPILLARY VISCOMETER
[75] Inventor: David E. Blair, Wilmington, Del.
[73] Assignee: E. I. du Pont de Nemours and Company, Wilmington, Del.
[22] Filed: Sept. 18, 1972
[21] Appl. No.: 290,069

[52] U.S. Cl. .................................................. 73/55
[51] Int. Cl. ........................................ G01n 11/08
[58] Field of Search............................ 73/55, 56, 54

[56] References Cited
UNITED STATES PATENTS
| | | | |
|---|---|---|---|
| 2,208,444 | 7/1940 | Bailey | 73/55 X |
| 3,420,096 | 1/1969 | Hoyt | 73/54 |
| 3,535,917 | 10/1970 | Blair et al. | 73/55 |

Primary Examiner—Richard C. Queisser
Assistant Examiner—Joseph W. Roskos

[57] ABSTRACT

A method for measuring the viscosity of a liquid comprising the steps of filling a capillary tube with the liquid through the capillary tube using a constant flow rate source of a solvent for the liquid as the motive force, and measuring the pressure drop across the capillary tube as the liquid flows through it. In the preferred embodiment, the liquid is a solute in solution with the solvent and the relative viscosity of the solute is measured by measuring the pressure drop across the capillary tube as the solution flows through it and as a solvent flows through it or a similar capillary.

22 Claims, 3 Drawing Figures

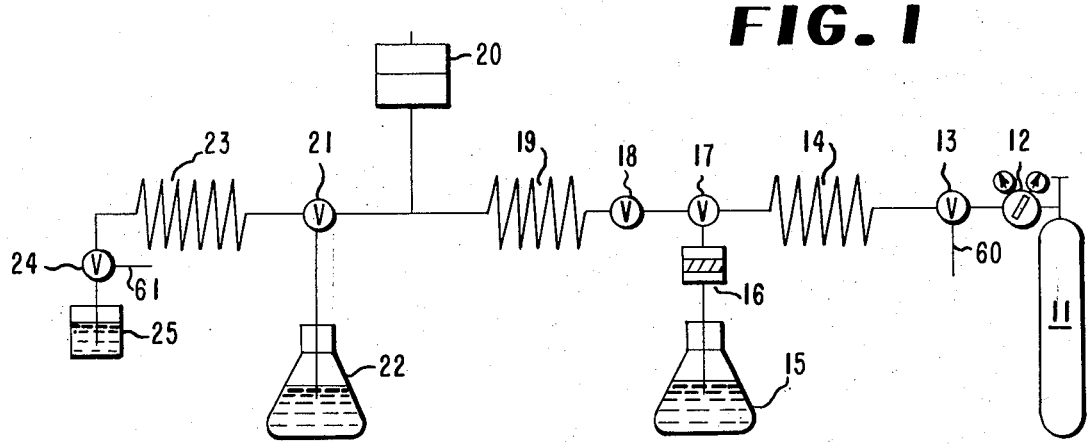
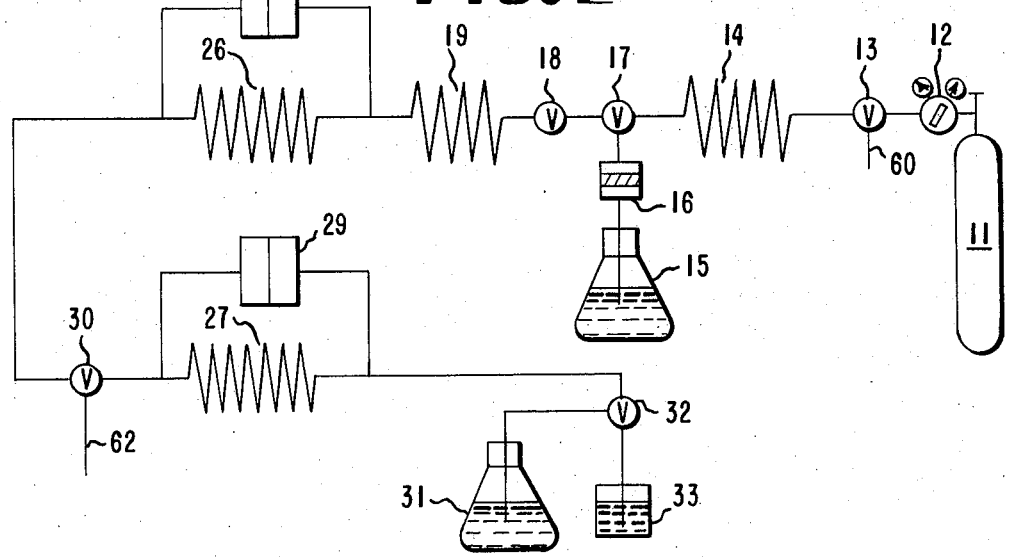
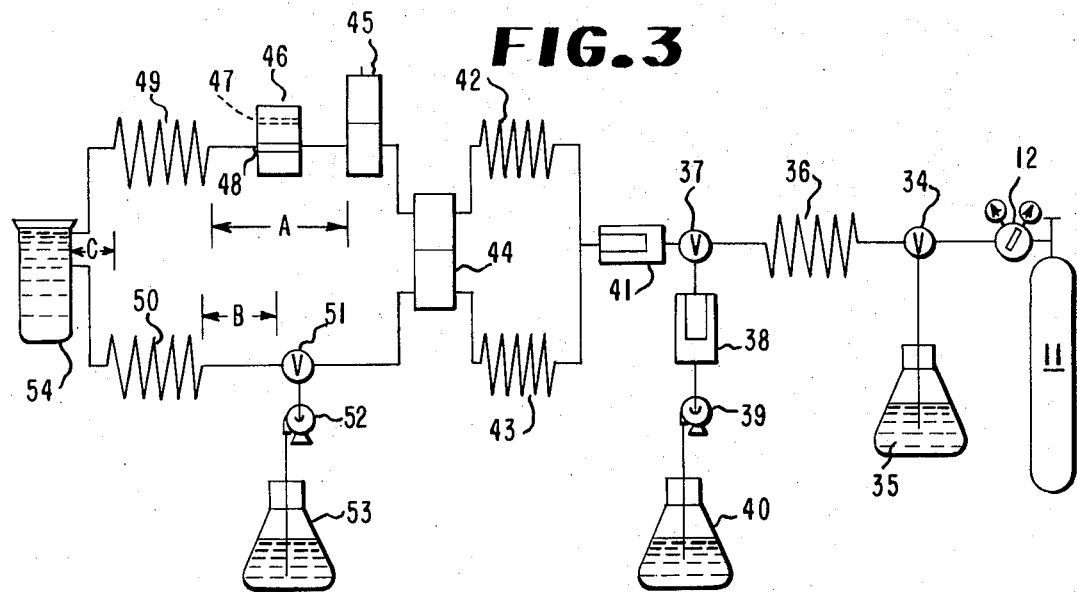

CAPILLARY VISCOMETER

BACKGROUND OF THE INVENTION

1. Field of the Invention:

This invention relates to capillary viscometers. More specifically, it relates to differential pressure capillary viscometers.

2. Discussion of the Prior Art:

A common need, in both research and the manufacture of polymers, is to obtain information concerning the molecular weight, the distrubution of molecular weights and the branching of polymers. One of the oldest means used to obtain such information is to measure the viscosity of a known concentration of a polymer in a solvent. The elementary art is concerned with the viscosity of the polymer-solvent solution, $n_p$; whereas the more advanced art is concerned with the ratio of the viscosity of the polymer-solvent solution, $n_p$, to that of the pure solvent, $n_s$. From the value of $n_p$ and $n_s$, two useful relations can be developed:

Relative viscosity $n_r = n_p/n_s$

Specific viscosity $n_{sp} = n_r - 1$

Even more useful relationships can be developed by combining $n_r$ and $n_{sp}$ with the polymer concentration, $c$.

Reduced viscosity $n_{red} = n_{sp}/c$

Inherent viscosity $n_{inh} = (1n \, n_r/c)$ and finally

Intrinsic viscosity $[n] = (n_{sp}/c)_{c=0} = (1n \, n_r/c)_{c=0}$

The prior art deals with apparatuses that are designed to measure simple viscosities. In such cases, a single capillary of known diameter and length is used and both the volume rate of flow of any solution and the pressure drop for flow through this capillary are measured at a given temperature. The various viscosities are then calculated from the known parameters.

There is a need for a simple accurate instrument to measure relative viscosity; one that is versatile, in the sense that different solvents can be used; one that has a rapid response time; and one that is accurate at low polymer concentrations where the inherent viscosity is essentially equal to the intrinsic viscosity. In addition, the instrument should be easy to use, self-cleaning and safe.

SUMMARY OF THE INVENTION

The above objectives are accomplished by a process for measuring the relative viscosity of a solute in solution with a solvent comprising the steps of a filling a capillary means, including a capillary tube, with the solution;

b forcing the solution through the capillary tube by supplying solvent at low pressure and constant flow rate to one end of the capillary means;

c measuring the pressure drop across the capillary tube when it is full of flowing solution; and d measuring the pressure drop across the capillary tube when it is full of flowing solvent.

The ratio of the two pressure drops is the relative viscosity of the solute in the solution.

An apparatus for accomplishing this method comprises in combination a capillary means through which the solution and the solvent flow;

b solution supply means connected to the capillary means for filling at least a portion of the capillary means with solution;

c solvent supply means for supplying solvent to the capillary means;

d rate control means, connected between the solvent supplying means and the capillary means, for maintaining constant the rate at which the solvent is supplied to the capillary means, regardless of the pressure drop across the capillary means; and e at least one pressure transducer connected to the capillary means for measuring the difference in the pressure drop across that portion of the capillary means through which the solvent flows and the pressure drop across that portion of the capillary means through which the solution flows.

The capillary means can comprise a single capillary tube, in which case the method comprises first filling the tube with solution, then flushing the solution from the tube, using the solvent to provide the force required to do this. The pressure drop across the capillary tube can then be measured continuously or incrementally to obtain the pressure drop across the capillary tube during solution flow and during solvent flow. The solvent flowing through the capillary tube, after the solution, has the added advantage of cleaning the capillary for further use.

The capillary means can also comprise two capillary tubes. In this case, here are two possible alternatives. Either the two tubes are connected in series or they are connected in parallel. If they are connected in series, the method consists of filling one tube, referred to as the second capillary tube, with solution and then supplying solvent through the first capillary tube to one end of the second capillary tube, so that the flow of solvent through the first tube causes the solution to flow through the second tube. The pressure drop across both tubes, one containing flowing solution and the other containing flowing solvent can then be measured simultaneously using two pressure transducers.

In the preferred embodiment, the two capillary tubes are connected in parallel; one is filled with solution, and solvent is than supplied to both tubes. Solvent alone flows through the first tube, and solution followed by solvent flows through the second tube. The pressure drop across each tube is measured by measuring the pressure drop across the first capillary tube with one pressure transducer and the difference in the pressure drop across the first tube and the pressure drop across the second tube using a differential pressure transducer.

In the preferred embodiment the solvent supply means is a high pressure solvent supply means comprising: a reservoir, connected to the rate control means; a source of solvent; means connected to the reservoir for filling the reservoir with the solvent; and a source of high pressure gas, connected to the reservoir, for forcing any solvent contained in the reservoir to the rate control means. The use of pneumatic pressure instead of a mechanical pump to supply the motive force for the fluid contained in the system eliminates the small but significant periodic pulsations in flow rate and pressure drop which can occur when mechanical pumps are used. Also in the preferred embodiment, the rate control means comprises a capillary tube for introducing a large pressure drop into the line between the capillary means and the solvent supply means. The accuracy of the present system depends upon the ability to maintain the flow rate in the system constant, regardless of whether a solution or a pure solvent is flowing through the capillary means. By introducing a large controlling pressure drop into the solvent line, variations in the flow rate through the capillary means due to changes in the viscosity of the fluid flowing through the capillary means can be minimized.

The relative viscosity can be calculated from the ratio of the pressure drop across the capillary tube in which the solution is flowing to the pressure drop across the capillary tube in which pure solvent is flowing. In the preferred embodiment, the differential in pressure is measured directly, which means that high accuracy at low solute concentrations can be obtained. In all cases, the actual flow rates and capillary diameters need not be measured, and the use of solvent as the motive force for the solution provides a simple convenient way to clean the system.

If desired the apparatus can be used to determine the viscosity of a sample liquid by filling the capillary tube with the sample liquid, and using another (second) liquid, preferably solvent for the sample liquid, to force the sample liquid to flow through the capillary tube. The viscosity of the sample liquid can then be measured by measuring the pressure drop across the capillary tube as the sample liquid flows through it and calculating the viscosity of the sample liquid from the measured value of the pressure drop and the known values of the dimensions of the capillary tube and the rate at which the sample liquid flows through the capillary tube. While this does not have the advantage of measuring relative viscosity directly, it does provide an easy way to use self-cleaning apparatus for measuring absolute viscosity. Alternatively, the second liquid can be a reference liquid, of known viscosity, and the relative viscosity of the sample liquid can be measured by comparing the viscosities of the sample liquid and the reference liquid using the two capillary technique discussed above.

For convenience, the discussion which follows will be limited to a discussion of an apparatus and method for its use which is designed for use in measuring the relative viscosity of a solute in solution with a solvent for the solute. The same apparatus and method can be used to measure the viscosity of any liquid.

BRIEF DESCRIPTION OF THE FIGURES

The invention can best be described with reference to the following figures, in which FIG. 1 is a schematic diagram of one embodiment of the present invention.

FIG. 2 is a schematic diagram of a second embodiment of the present invention.

FIG. 3 is a schematic diagram of a third embodiment of the present invention.

DETAILED DESCRIPTION OF THE FIGURES

FIG. 1 illustrates one embodiment of the present invention utilizing a single capillary tube 23. The capillary means comprises the capillary tube 23 and the fluid lines on either side of it between valves 21 and 24. A solution supply means is also provided. It comprises a reservoir 22, for the solution, connected to one side of the capillary means through valve 21, and a vacuum line 61 connected to the other side of the capillary means through valve 24. When needed, a vacuum can be provided by any conventional means such as a vacuum pump or an aspirator. The apparatus also omprises a solvent supply means comprising a solvent holding container, comprises in this case is a coiled tube 14 and the fluid lines on either side of it between valves 13 and 17; a reservoir 15 for solvent, connected to one end of the solvent holding container through a filter 16 and 17; a vacuum line 60, connected to the other end of the solvent holding container through valve 13 and a source of high pressure gas consisting of a gas cylinder 11 and a regulator 12 also connected to the solvent holding container through valve 13. The solvent supplying means is connected to the capillary means through a rate control means which in this embodiment is a capillary restriction provided by coil 19. Also included in the apparatus are a waste container 25, an on-off flow control valve 18, and a pressure transducer 20 connected to the capillary means. For convenience, differential pressure transducers are used throughout. Other pressure transducers can be used in most cases, but if they are, corrections must be made for changes in atmospheric pressure.

The motive force for the fluid in the apparatus is provided by a high pressure inert gas, such as nitrogen, contained in a gas cylinder 11. The pressure of the gas is reduced by the regulator to the range of about 3.5 to about 35 kg./cm.$^2$. Higher pressures may be used if suitable tubing and valves are provided. The use of pneumatic pressure instead of a mechanical pump eliminates the small but significant periodic pulsations in flow rate and pressure drop that can occur with mechanical pumps. To insure that the rate at which fluid flows through capaillary tube 23 is constant, regardless of whether solvent or solution is flowing through capillary tube 23, a flow restriction is inserted into the fluid line between the solvent supply means and the capillary means. In the embodiment illustrated, this is a capillary coil 19 which introduces a pressure drop in the system considerably greater than that introduced by the capillary means. Only solvent flows through coil 19. Both solvent and solution flow in turn through coil 23. The pressure drop across coil 19, therefore, remain constant whereas the pressure drop across coil 23 will vary depending upon which fluid is flowing through coil 23. By introducing a large controlling pressure drop in the solvent line, via coil 19, variations in the flow rate of fluid through coil 23, due to a change in the viscosity of the fluid flowing through the coil can be minimized. Capillary tube 23 is made of glass precision bore capillary tubing, 0.30 to 1.0 mm. in diameter and about 30 cm. long. Capillary tube 19 is made of stainless steel capillary tubing 0.2 to 0.5 mm. in diameter and about 1,500 cm. long. These dimensions are not critical and can be adjusted as circumstances warrant.

The consumption of pure solvent is small in any single run. The solvent is stored in coil 14 which has an inside diameter of about 0.22 cm and a length of between 100 to 500 cm. These dimensions can be varied to give the desired solvent holding volume. The solvent removed from the holding coil during a run or series of runs is replaced by closing valve 18, rotating valve 13 from the high pressure nitrogen cylinder to the vacuum line 60, and rotating valve 17 to admit the desired amount of filtered pure solvent from the reservoir 15. The filter 16 used in the present embodiment consists of a stainless steel microporous filter with openings of about 50–75 microns. After refilling coil 14, valves 18, 17 and 13 are rotated to allow pure solvent to flow in the direction of the capillary coil 23. Capillary tube 23 can be filled with solute-solvent solution in much the same manner by rotating valves 21 and 24 to connect the reservoir 22 containing the solution to vacuum line 61. When the capillary means including coil 23 and the lines connected to it between valves 21 and 24 are filled with solution, valves 21 and 24 are again rotated to connect the capillary means to the solvent supply means.

The operation of the apparatus is as follows. The system is first purged with solvent. This is accomplished by filling the solvent holding coil 14 with solvent as described above and turning valves 13, 17, 18, 21 and 24 so that pure solvent can flow through the system from the solvent holding coil 14 to the waste reservoir 25. This process is repeated continuously or several times until the system is purged of any contaminants other than those contained in the solvent. This process should be repeated every time a different solvent is used. When the entire system is filled with solvent, valves 21 and 24 are rotated so that the region of the system between valve 21 and 24 can be filled with solute-solvent solution from reservoir 22. Valves 13, 17, 18, 21 and 24 are then realigned so that solvent flowing from solvent holding coil 14 through the system forces the solution contained in the capillary means to flow through capillary tube 23. The pressure drop across the capillary tube 23, as the solution flows through it, is measured by pressure transducer 20. In time the solvent flowing in the system forces all of the solution contained in the capillary means into waste receptacle 25 and the capillary tube 23 is filled with pure solvent. At this point, pressure transducer 20 measures the pressure drop across the capillary tube 23 with pure solvent flowing through the tube. The ratio of the pressure drop across capillary tube 23 with solution flowing through it to the pressure drop across capillary tube 23 with pure solvent flowing through it is the relative viscosity. The only experimental data that need be recorded are these pressure drops. Neither the flow rate or the capillary diameter and length are needed or used in calculating the various relative viscosities. These later values are needed only if it is desired to calculate the absolute viscosity of any individual solution.

FIG. 2 illustrates a second embodiment of the present invention in which two capillary tubes 26 and 27 are used in the capillary means. The solvent supply means and the rate control means are identical with that shown in FIG. 1. The difference between the apparatus shown in FIG. 2 and FIG. 1 is that the capillary means comprises a first capillary tube 26 and the second capillary tube 27. It is the latter capillary tube which is filled with solution by rotating valves 30 and 32 so that solution can be drawn from reservoir 31 by a vacuum applied to vacuum line 62. Two pressure transducers 28 and 29 are connected to the first and second capillary tubes, respectively. Capillary tubes 26 and 27 are again made of glass precision capillary tubing, and they are of nearly identical diameter and length so that the pressure drop across both capillaries is equal for a given flow rate.

In operation the entire system is first flushed several times with solvent in the manner discussed above and then the portion of the capillary means including capillary tube 27 and the fluid line connected to it between valves 30 and 32 are filled with solution in the manner discussed above. Valves 13, 17, 18, 30 and 32 are then turned so that the fluid contained in the system can be discharged into waste reservoir 33. In the process pure solvent flows through capillary tube 26 and, initially at least, solution flows through capillary tube 27. The pressure drop across each capillary can be measured simultaneously with transducers 28 and 29, and the relative viscosity calculated from the ratio of the two pressure drops.

FIG. 3 illustrates a preferred embodiment of the present invention. As with the embodiments discussed with respect to FIGS. 1 and 2, the driving force for fluid contained in the lines is provided by nitrogen gas in cylinder 11, which is reduced from a high pressure by regulator valve 12 to a pressure in the range 3.5 to 35 kg/cm.$^2$. The solvent is stored in coil 36 which has an internal diameter of about 0.22 cm. and a length of about 460 cm. These dimensions give a volume that is sufficient to contain enough solvent for at least four sample runs. Rather than to use a vacuum, the coil 36 is filled by rotating three-way valve 34 to waste receptacle 35, rotating three-way valve 37 to the solvent storage reservoir 40, and starting the electric pump 39. The solvent is then forced from the reservoir into the coil, by the action of the pump, through filter element 38 which is made from sintered microporous stainless steel having an average pore diameter of 50 to 75 microns. The filter is made in the form of capped hollow cylinder (i.e., similar to a so-called candle filter) which has inner dimensions of 0.395 cm, i.d., by 1.111 cm. long, and outer dimensions of 0.795 cm., o.d. by 1.270 cm. long. The second filter 41 which is identical to filter 38 is also provided in the main fluid line.

As with the previous examples the two capillary tubes used in the capillary means, i.e., tubes 49 and 50, are cut from the same piece of precision bore capillary glass tubing, which in this particular embodiment has an internal diameter of 0.0406 cm. and a length of 28.0 cm. Each end of the two glass capillaries is flared so that the included angle of each capillary end is 14°. This is done to minimize the so-called kinetic energy end effects in fluid flow. For a given flow rate, which in this case is about 1 ml./min., the tube glass capillaries are selected from a number of samples so that the pressure drop is the same within 0.2 percent. The two capillary tubes 42 and 43 which comprise the rate control means are stainless steel capillary tubes having an internal diameter of 0.0284 cm. and a length of 1,520 cm. The lengths of these coils are adjusted, by cutting them, so that the flow rates are equal to within 0.2 percent at a flow of about 1 ml./min.

Transducers 44 and 45 of FIG. 3 and the transducers shown in FIGS. 1 and 2, were purchased as Pace Model P7D devices from the Instrument Systems Division of the Whittaker Corp. These are described as being differential pressure transducers having a variable reluctance D.C. output. In order to decrease their hysteresis, the stainless steel diaphragms were removed and replaced with gold plated spring steel diaphragms. The resulting transducers had the following properties.

TABLE I

| | Transducer 44 | Transducer 45 of FIG. 3, 28, 29 of FIG. 2 |
|---|---|---|

FIG. 3

| Diaphragm, thickness mm. | 0.015 | 0.025 |
|---|---|---|
| Range full scale, Kg./cm² | 0.052 | 0.148 |
| Precision | ± 0.2% | ± 0.2% | and 20 of FIG. 1.

The transducers used are of the type that converts a pressure signal into an electrical voltage.

Valve 46 is a special block valve designed to provide a narrow channel 47 or a wide channel 48 as desired. In this particular embodiment, the special block valve is a "Cheminert" valve Model CV-2 manufactured by Chromatronix Incorporated. The capillary means is constructed so that at the time the inherent viscosity is measured, the tubing length A of pure solvent is equal to the tubing length B containing the polymer solvent solution, and so that the tubing diameter of lengths A and B are equal. Furthermore, the tubing diameter and length in section C between the discharge of capillaries 49 and 50 and waste receptacle 54 are also equal. A portion of the capillary means including capillary tube 50 and the fluid lines attached to it between valve 51 and waste receptacle 54 are filled with solution in much the same manner as discussed above except that instead of using a vacuum to draw solution from solution receptacle 53 a mechanical pump 52 is used.

In operation, coil 36 is first filled with pure solvent is discussed above and then valve 34 and 37 are rotated so that the flow of pure solvent is directed to flush out the entire system between valve 37 and waste receptacle 54. It is important to adjust the special block valve 46 so that the larger bore of the valve is in the path of fluid flow through capillary 49. After about 4.5 minutes, the voltage on transducer 44 ($\Delta E_S$) is recorded. The procedure is repeated twice more, at which time the solvent changeover is completed. Whenever a new solvent is used the procedure described above is repeated.

Before measuring the relative viscosity, it is necessary to determine the relative response K of the two transducers 44 and 45. This is done in the following way. With pure solvent flowing in both capillaries 49 and 50, and shortly after measuring ($\Delta E_S$) the voltage reading of transducer 45 ($E_{S,1}$) is recorded. In this case, the fluid flow is passed through the larger bore of special block valve 46 which has the same diameter as the tubing used throughout the rest of the system to connect the various pieces of the apparatus together, i.e., 0.157 cm. The plug of block valve 46 is then moved so that the smaller bore of block valve (0.0203 cm. in diameter by 0.635 cm. long) is inserted into the flow path. After a short time to allow transducer 45 to reach a steady reading, which in this case is about 5 seconds, the output of that transducer ($E_{S,c}$) is recorded. At the same time at which $E_{S,c}$ is recorded, the value of $\Delta E_{S,c}$ is recorded from transducer 44. The flow ratio calibration constant K can then be calculated from the following equation $$K = -\Delta E_{S,c} - \Delta E_S/E_{S,c} - E_{S,1}$$

where $\Delta E_S$ is the reading of transducer 44 when pure solvent is flowing through both capillaries 49 and 50 and the large bore is in place in valve 46, $\Delta E_{S,c}$ is the reading of transducer 44 when pure solvent is flowing through both capillaries 49 and 50 and the small bore is in place in valve 46, $E_{S,1}$ is the reading of transducer 45 when pure solvent is flowing through capillary 49 and the large bore is in place in valve 46, and $E_{S,c}$ is the reading of transducer 45 when pure solvent is flowing through capillary 49 and the small bore is in place in valve 46.

Experimentally, it is necessary to redetermine K only about once every eight hours. After this has been accomplished, the plug of block valve 46 is moved so that the larger bore of the valves returns to its original position in the path of fluid flow.

A dilute solution of polymer dissolved in the solvent is charged to capillary 50 by rotating three-way valve 51 in the direction of the sample storage flask 53 and starting pump 52. The flow is continued until about 15 ml. of solution is pumped, in order to flush out any residual foreign solution in the capillary, between valve 51 and waste reservoir 54.

By convention, the polymer concentration in the solvent is 0.100 grams per 100 milliliters of solvent. In this case the polymer concentration is sufficiently close to 0 so that the measurement of inherent polymer viscosity by this apparatus is essentially equal to the intrinsic viscosity as given by the equation above. Valve 51 is then rotated in the direction of the solvent storage coil 36, and flow of both pure solvent in capillary 49 and polymer-solvent solution in the capillary 50 is started. The flow rates of these two streams has been adjusted previously to be equal to within about 0.2 percent. After allowing transducer 44 to reach a steady reading, which in this case is about 15 seconds, its reading $\Delta E_p$ is recorded. The reading on transducer 45 ($E_{S,1}$) is also recorded at this time.

Valve 37 is then turned so that all flow is stopped in the system. A short time is allowed to elapse for transducer 45 to reach a steady reading, which in this case is about 10 seconds, and then its reading ($E_{S,2}$) is recorded.

EXAMPLE

Typical values measured for a EPDM hydrocarbon rubber dissolved in perchloroethylene solvent for a concentration, $c = 0.1011$ grams per 100 milliliter are as follows

TABLE II

| | Calibration of Transducers Nos. 14 & 18, Volts | Experimental Measurements on Polymer Solution, Volts |
|---|---|---|
| $E_{S,1}$ | 5.181 | 5.117 |
| $E_{S,2}$ | — | 0.235 |
| $E_{S,c}$ | 6.810 | — |
| $\Delta E_p$ | — | 3.431 |
| $\Delta E_S$ | 1.061 | 1.058 |
| $\Delta E_{S,c}$ | −3.574 | — | where $\Delta E_P$ is the reading of transducer 44 with pure solvent flowing through capillary 49 and solution flowing through capillary 50, with the large bore of valve 46 in place, and $E_{S,2}$ is the reading of transducer 45 when no solvent is flowing through capillary 49.

The value of calibration constant K is calculated in equation given above as follows $$K = -(-3.574 - 1.061/6.810 - 5.181)$$
$$K = 4.635/1.629 = 2.845$$

The value of the inherent viscosity is calculated from the following equation no. 4:

$$n_{inh} = \frac{\ln\left[1 + \frac{(\Delta E_P - \Delta E_S)}{K(E_{S,1} - E_{S,2})}\right]}{c}$$

For the above example, $n_{inh}$ is calculated to be:

$$n_{inh} = \frac{\ln\left[1 + \frac{(3.431 - 1.058)}{2.845(5.117 - 0.235)}\right]}{0.1011}$$

$$n_{inh} = 1.56$$

It is preferred to use the parallel flow apparatus shown in FIG. 3 than either the series flow apparatus shown in FIG. 2 or the sequential flow apparatus shown in FIG. 1 because of the increased precision of measurement. This improvement results from the fact that in the parallel flow apparatus a sensitive transducer is used to measure directly the difference in the pressure drops for equal flows in the two capillaries whereas in the other two methods of measurement, the pressure drop differences are calculated or determined from the difference in the measured pressure drops using less sensitive transducers.

The precision of a transducer is given by the absolute voltage uncertainty that a given voltage has at a specified value. For example, in the case of the transducers used here, the voltage output at full scale is 10 v. and the precision is 0.2 percent of the output which amounts to $\pm 0.02$ v. If the full output of this transducer is adjusted to 0.07 Kg./cm$^2$, by proper selection of a relatively stiff diaphragm, the precision of any reading is $$\pm (0.2/100)\, 0.07 = \pm^4 \, 1.4 \times 10^{-4} \text{ Kg./cm.}^2$$

Alternatively, if the full output of this transducer is adjusted to read 0.007 Kg./cm.$^2$ the precision is decreased to $\pm 1.4 \times 10^{-5}$ Kg./cm.$^2$ In series or sequential flow, the combined precision, U, of the two coarse transducers, each of which has a range of 0.07 Kg./cm.$^2$ is given by the following equations:

$$U = [(P_2 \pm 0.00014) - (P_1 \mp 0.00014)] - \Delta P$$
$$P_2 = P_1 + \Delta P$$
$$U = [(P_1 + \Delta P \pm 0.00014) - (P_1 \mp 0.00014)] - \Delta P$$
$$U = \pm 0.00028$$

where $P_1$ and $P_2$ are the pressures applied to each transducer. Hence the ratio of the precision of the parallel and series flow measurement methods is such that the uncertainty is series or sequential flow is 20-fold that in parallel flow. Nonetheless, these embodiments provide a simple, convenient means of measuring relative viscosity in those cases where high precision is not essential.

What is claimed is:

1. An apparatus for measuring the relative viscosity of a solute in solution with a solvent for said solute, comprising in combination:
   a capillary means through which said solvent and said solution flow;
   b solution supply means connected to said capillary means for filling at least a portion of said capillary means with said solution;
   c solvent supply means for supplying said solvent to said capillary means;
   d rate control means connected between said solvent supply means and said capillary means for maintaining constant the rate at which said solvent is supplied to said capillary means, regardless of the pressure drop across said capillary means; and
   e at least one pressure transducer connected to said capillary means for measuring the difference in the pressure drop across that portion of said capillary means through which said solvent flow and that portion of said capillary means through which said solution flow.

2. An apparatus for measuring the relative viscosity of a solute in solution with a solvent for said solute, comprising in combination:
   a capillary means comprising a capillary tube through which both said solution and said solvent flow;
   b solution supply means connected to said capillary tube for filling said capillary tube with said solution;
   c solvent supply means for supplying said solvent to said capillary tube;
   d rate control means connected between said solvent supply means and said capillary tube for maintaining constant the rate at which said solvent is supplied to said capillary tube, regardless of the pressure drop across said capillary tube; and
   e a pressure transducer connected to the upstream side of said capillary tube for measuring the pressure drop across said capillary tube.

3. The apparatus of claim 2 wherein said solvent supply means is a high pressure solvent supply means and said rate control means is a pressure reducing means.

4. The apparatus of claim 3 wherein said high pressure solvent supply means comprises a solvent holding means connected to said rate control means, a solvent reservoir, means for filling said solvent holding means with the solvent contained in said solvent reservoir, and a source of high pressure gas connected to said solvent holding means for forcing any solvent contained in said solvent holding means to said rate control means.

5. The apparatus of claim 3 wherein said rate control means is a second capillary tube for introducing a large pressure drop in the line between the capillary tube through which both said solution and said solvent flow and said high pressure solvent supply means.

6. An apparatus for measuring the relative viscosity of a solute in solution with a solvent for said solute, comprising in combination:
   a capillary means comprising first and second matched capillary tubes, said first and second capillary tubes being connected in series;
   b solution supply means connected to said second capillary tube for filling said second capillary tube with solute;
   c solvent supply means for supplying solvent to said capillary means;
   d rate control means connected between said solvent supply means and said first capillary tube for maintaining constant the rate at which solvent is supplied to said capillary means, regardless of the pressure drop across said capillary means; and
   e first and second pressure transducers connected to said first and second capillary tubes, respectively, for measuring the pressure drop across each capillary tube.

7. The apparatus of claim 6 wherein said solvent supply means is a high pressure solvent supply means and said rate control means is a pressure reducing means.

8. The apparatus of claim 7 wherein said high pressure solvent supply means comprises a solvent holding means connected to said rate control means, a solvent reservoir, means for filling said solvent holding means with the solvent contained in said solvent reservoir, and a source of high pressure gas connected to said solvent holding means for forcing any solvent contained in said solvent holding means to said rate control means.

9. The apparatus of claim 7 wherein said rate control means is a capillary tube for introducing a large pressure drop in the line between said capillary means and said high pressure solvent supply means.

10. An apparatus for measuring the relative viscosity of a solute in solution with a solvent for said solute, comprising in combination:
 a capillary means comprising first and second matched capillary tubes, said first and second capillary tubes being connected in parallel;
 b solution supply means connected to said second capillary tube for filling said second capillary tube with said solution;
 c solvent supply means for supplying said solvent to said capillary means;
 d rate control means connected between said solvent supply means and said capillary means, for maintaining constant the rate at which said solvent is supplied to each of the capillary tubes, regardless of the pressure drop across either of said capillary tubes;
 e a differential pressure transducer, one side of which is connected to said first capillary tube and the other side of which is connected to said second capillary tube, for measuring the difference between the pressure drop across said first capillary tube and the pressure drop across said second capillary tube; and
 f a pressure transducer connected to said first capillary tube for measuring the pressure drop across said first capillary tube.

11. The apparatus of claim 10 wherein said solvent supply means is a high pressure solvent supply means and said rate control means is a pressure reducing means.

12. The apparatus of claim 11 wherein said high pressure solvent supply means comprises a solvent holding means connected to said rate control means, a solvent reservoir, means for filling said solvent holding means with the solvent contained in said solvent reservoir, and a source of high pressure gas connected to said solvent holding means for forcing any solvent contained in said solvent holding means to said rate control means.

13. The apparatus of claim 11 wherein said rate control means comprises at least one capillary tube for introducing a large and equal pressure drop in the line between said high pressure solvent supply means and said first capillary tube and in the line between said high pressure solvent supply means and said second capillary tube.

14. An apparatus for measuring the viscosity of a sample liquid comprising in combination
 a capillary means;
 b sample liquid supply means connected to said capillary means for filling at least a portion of said capillary means with said sample liquid;
 c second liquid supply means for supplying a second liquid to said capillary means to force said sample liquid to flow through said capillary means;
 d rate control means connected between said second liquid supply means and said capillary means for maintaining constant the rate at which said second liquid is supplied to said capillary means, regardless of the pressure drop across said capillary means; and
 e at least one pressure transducer connected to said capillary means for measuring the pressure drop across that portion of said capillary means through which said sample liquid flows.

15. The apparatus of claim 14 wherein said second liquid is a solvent for said sample liquid.

16. The apparatus of claim 14 wherein said second liquid is a reference liquid of known viscosity.

17. A method of measuring the viscosity of a sample liquid comprising the steps of
 a filling a capillary means, including a capillary tube with said sample liquid;
 b forcing said liquid to flow through said capillary tube by supplying a second liquid at a constant flow rate to one end of said capillary means; and
 c measuring the pressure drop across said capillary tube when said capillary tube is full of flowing sample liquid.

18. A method of measuring the relative viscosity of a solute in solution with a solvent for said solute comprising the steps of:
 a filling a capillary means including a capillary tube with said solution;
 b forcing said solution through said capillary tube by supplying said solvent at a constant flow rate to one end of said capillary means;
 c measuring the pressure drop across said capillary tube when said capillary tube is full of flowing solution; and
 d measuring the pressure drop across said capillary tube when said capillary tube is full of flowing solvent.

19. A method of measuring the relative viscosity of a solute in solution with a solvent for said solute comprising the steps of:
 a filling at least a portion of a capillary means including first and second capillary tubes with said solution, the portion of said capillary means filled with said solution including said second capillary tube;
 b forcing said solution through said second capillary tube by supplying said solvent at a constant flow rate to said first and second capillary tubes;
 c measuring the pressure drop across said first and second capillary tubes as said solution flows through said second capillary tube and said solvent flows through said first capillary tube.

20. The method of claim 19 wherein said first and second capillary tubes are connected in series and said solvent flows through said first capillary tube before flowing through said second capillary tube.

21. The method of claim 19 wherein said first and second capillary tubes are connected in parallel and when only solvent is supplied to said first capillary tube, said solvent also being supplied to said second capillary tube to force the solution contained therein through said second capillary tube.

22. The method of claim 19 wherein the step of measuring the pressure drop across said first and second capillary tubes comprises measuring the pressure drop across said first capillary tube, and also measuring the difference in the pressure drop across said first capillary tubes and the pressure drop across said second capillary tube.

* * * * *